(No Model.)

A. SCHWARZSCHILD & N. GREENFIELD.
CONFECTIONERY.

No. 315,559. Patented Apr. 14, 1885.

WITNESSES
Wm. A. Lowe
Mary Sheridan

INVENTOR
August Schwarzschild
Nelson Greenfield
By Thos. A. Coe
Attorneys

UNITED STATES PATENT OFFICE.

AUGUST SCHWARZSCHILD AND NELSON GREENFIELD, OF NEW YORK, N. Y.

CONFECTIONERY.

SPECIFICATION forming part of Letters Patent No. 315,559, dated April 14, 1885.

Application filed February 4, 1885. (No model.)

*To all whom it may concern:*

Be it known that we, AUGUST SCHWARZSCHILD and NELSON GREENFIELD, residing in the city, county, and State of New York, have as joint inventors invented a new and useful Improvement in Candies or Confectioneries, of which the following, taken in connection with the accompanying drawings, is a full, clear, and accurate description.

The object of our invention is to produce a combination-candy consisting of a hard smooth outer surface or shell made of sugar or sugar-compound, with a soft interior, so that eggs, fruit, or other like articles having a smooth exterior shell and a soft interior or yelk may be imitated in the construction of the candy.

We accomplish our object by combining with an edible smooth shell or exterior, preferably made of sugar or sugar-compound, a soft interior made of the material known in the confectionery trade as "marshmallow-stock" or "moonshiner-stock," made of white of eggs, gelatine, sugar, and glucose.

Figure 1:
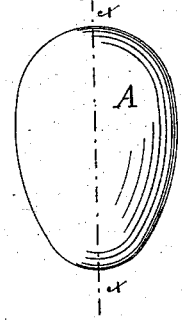
Figure 2:
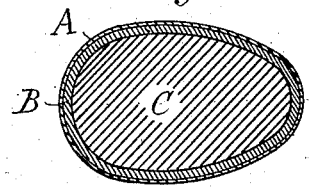

In the drawings, Figure 1 represents our combination of material formed into the shape of an egg. Fig. 2 shows a sectional view of the same.

A represents the whole combination; B, the smooth hard exterior or shell; C, the soft interior or yelk.

By suitable coloring the appearance of the yelk or interior of an egg may be imitated, the whole combination thus being made to resemble an egg in exterior and interior construction and general appearance.

We do not confine ourselves to the construction and appearance of eggs in the combination of material above set forth, but intend to use the said combination for the imitation of the appearance and construction in candy and confectionery of fruit and any articles composed in nature of a hard smooth exter. or or shell with a soft interior.

Having thus described our invention, what we claim, and desire to secure by Letters Patent, is—

As a new article of manufacture, a candy consisting of the combination of a hard smooth exterior or shell composed of sugar or sugar compound with a soft interior composed of marshmallow or moonshiner stock, substantially as described.

In testimony whereof we have hereunto set our hands this 30th day of January, 1885.

AUGUST SCHWARZSCHILD.
NELSON GREENFIELD.

In presence of—
LOUIS W. FROST.
R. T. VAN BOSKERCK.